(12) United States Patent
Cremona

(10) Patent No.: US 10,118,543 B2
(45) Date of Patent: Nov. 6, 2018

(54) APPARATUS AND METHOD FOR CONTROLLING A VEHICLE TRAILER DIRECTIONAL MOTION INDICATOR

(71) Applicant: Bendix Commercial Vehicle Systems LLC, Elyria, OH (US)

(72) Inventor: Michael D. Cremona, Lakewood, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/349,706

(22) Filed: Nov. 11, 2016

(65) Prior Publication Data

US 2018/0134209 A1    May 17, 2018

(51) Int. Cl.
| | | |
|---|---|---|
| *B60Q 1/50* | (2006.01) | |
| *B60K 35/00* | (2006.01) | |
| *B60Q 1/34* | (2006.01) | |
| *B60Q 5/00* | (2006.01) | |
| *G01P 13/00* | (2006.01) | |
| *B60R 21/00* | (2006.01) | |
| *B60R 21/01* | (2006.01) | |

(52) U.S. Cl.
CPC ............ *B60Q 1/346* (2013.01); *B60K 35/00* (2013.01); *B60Q 1/50* (2013.01); *B60Q 5/005* (2013.01); *B60R 21/00* (2013.01); *B60R 21/01* (2013.01); *G01P 13/00* (2013.01); *B60R 2021/0069* (2013.01); *B60R 2021/01027* (2013.01); *B60R 2300/8093* (2013.01); *B60W 2300/14* (2013.01)

(58) Field of Classification Search
CPC ............ B60Q 1/46; B60Q 1/50; H04R 1/20

USPC ............................ 701/36; 340/463, 468, 472
See application file for complete search history.

(56) References Cited

U.S. PATENT DOCUMENTS

| | | | |
|---|---|---|---|
| 6,380,883 B1 | 4/2002 | Bell et al. | |
| 7,352,278 B2 | 4/2008 | Terzian | |
| RE40,878 E | 8/2009 | Bishop | |
| 8,548,722 B2 * | 10/2013 | Puhalla | B60W 40/11 |
| | | | 701/124 |
| 8,744,700 B2 * | 6/2014 | Beams | B60W 30/18027 |
| | | | 701/110 |
| 8,755,984 B2 | 6/2014 | Rupp et al. | |

(Continued)

FOREIGN PATENT DOCUMENTS

| | | |
|---|---|---|
| AU | 2012254864 A1 | 6/2014 |
| JP | 2010193939 A | 9/2010 |

OTHER PUBLICATIONS

Communication from European Patent Office including European Search Report and European Search Opinion for counterpart EP Patent Appln. No. 17001796.6, dated Apr. 19, 2018, 11 pages.

*Primary Examiner* — Tan Q Nguyen
(74) *Attorney, Agent, or Firm* — Brian E. Kondas; Cheryl L. Greenly; Eugene E. Clair

(57) ABSTRACT

A device for controlling a directional motion indicator includes a motion detector transmitting a directional motion signal based on a movement and a direction of the movement of the motion detector. A controller includes a controller input port receiving the directional motion signal. The controller determines a backward movement of the motion detector based on the directional motion signal. The controller transmits a motion indicator signal, via a controller output port, based on the determined backward movement of the motion detector.

21 Claims, 3 Drawing Sheets

(56) References Cited

U.S. PATENT DOCUMENTS

| | | | | |
|---|---|---|---|---|
| 8,880,288 B2* | 11/2014 | Li | ............................ | B60T 8/172 |
| | | | | 180/199 |
| 9,296,423 B2 | 3/2016 | Rupp et al. | | |
| 9,469,250 B2* | 10/2016 | Lynam | ........................ | B60R 1/00 |
| 2002/0084929 A1* | 7/2002 | Stefanik | .................. | G08C 17/00 |
| | | | | 341/176 |
| 2002/0180595 A1 | 12/2002 | Flick | | |
| 2003/0141965 A1 | 7/2003 | Gunderson et al. | | |
| 2005/0242931 A1 | 11/2005 | Gunderson et al. | | |
| 2010/0141419 A1* | 6/2010 | Coward | .................... | B60Q 1/22 |
| | | | | 340/464 |
| 2010/0191408 A1* | 7/2010 | Boylston | ................. | A01D 75/28 |
| | | | | 701/31.4 |
| 2013/0116892 A1 | 5/2013 | Wu et al. | | |
| 2013/0308326 A1* | 11/2013 | Kasaba | ..................... | B60Q 1/10 |
| | | | | 362/465 |
| 2014/0253315 A1* | 9/2014 | Bement | .................. | B60Q 1/447 |
| | | | | 340/479 |
| 2014/0300462 A1 | 10/2014 | Russ | | |
| 2015/0145661 A1* | 5/2015 | Beggs | .................. | B60Q 1/2673 |
| | | | | 340/435 |
| 2016/0101811 A1* | 4/2016 | Kyrtsos | .................. | B62D 13/06 |
| | | | | 701/25 |

\* cited by examiner

US 10,118,543 B2

APPARATUS AND METHOD FOR CONTROLLING A VEHICLE TRAILER DIRECTIONAL MOTION INDICATOR

BACKGROUND

The present invention relates to a vehicle motion indicator. It finds particular application in conjunction with a vehicle motion indicator and a motion detector on a vehicle trailer and will be described with particular reference thereto. It will be appreciated, however, that the invention is also amenable to other applications.

Articulated vehicles typically include a towing portion and a towed portion. For example, articulated trucks include a tractor and a trailer. When traveling in a reverse direction (e.g., backing-up), the towed portion of the articulated vehicle (e.g., the trailer of the articulated truck) does not receive a reverse or backup signal from the towing portion (e.g., the tractor of the articulated truck). Therefore, even if the towing portion of the vehicle includes visual and/or audible indicator(s) to warn other drivers and/or pedestrians in the vicinity of the vehicle that the vehicle is backing-up, there is no signal to activate such indicators on the towed portion of the vehicle.

The present invention provides a new and improved apparatus and method which addresses the above-referenced problems.

SUMMARY

In one aspect of the present invention, it is contemplated that a device for controlling a directional motion indicator includes a motion detector transmitting a directional motion signal based on a movement and a direction of the movement of the motion detector. A controller includes a controller input port receiving the directional motion signal. The controller determines a backward movement of the motion detector based on the directional motion signal. The controller transmits a motion indicator signal, via a controller output port, based on the determined backward movement of the motion detector.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
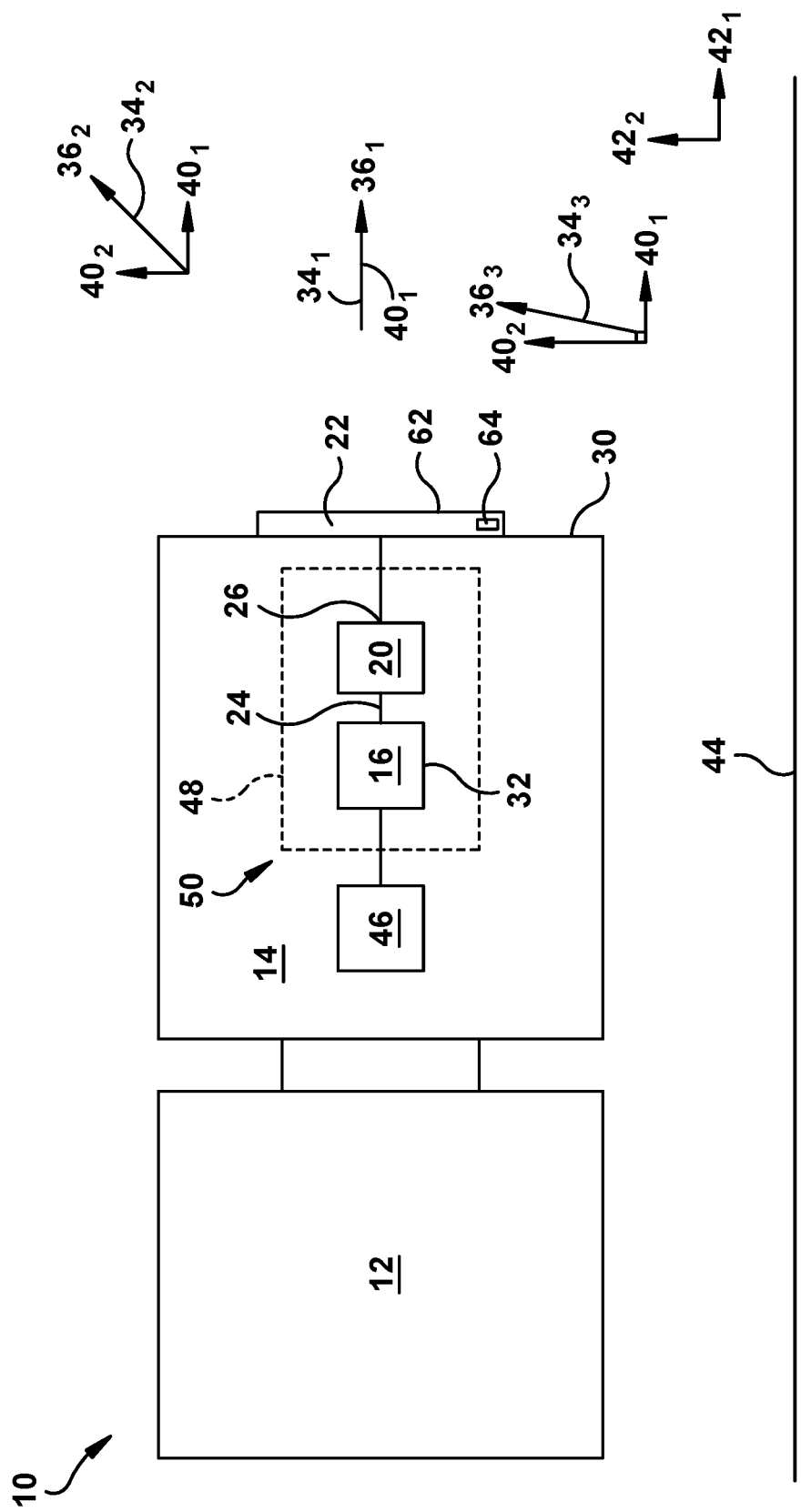
FIG. 1 illustrates a schematic representation of a simplified component diagram of an exemplary vehicle including a tractor and a trailer including both a motion detector and a directional motion indicator on the vehicle trailer in accordance with one embodiment of an apparatus illustrating principles of the present invention.

With reference to FIG. 1, a simplified component diagram of an exemplary vehicle 10 including a tractor 12 and a trailer 14 is illustrated in accordance with one embodiment of the present invention.

The trailer 14 includes a motion detector 16, an electronic control unit (ECU) 20 electrically communicating with the motion detector 16, and a directional motion indicator 22 electrically communicating with the ECU 20. The directional motion indicator is controlled (e.g., activated and/or deactivated) by the ECU 20 based on a directional motion signal received by the ECU 20 from the motion detector 16. The directional motion signal is based on a movement and a direction of the movement of the motion detector 16.

In one embodiment, the ECU 20 includes an electrical input port 24 that receives the directional motion signal from the motion detector 16 when the trailer 14 is moving above a predetermined velocity (e.g., between about one-half (0.5) and 1.5 mph and in one example 1.0 mph) in a reverse (e.g., backward) direction. In one embodiment, it is contemplated that the electrical input port 24 of the ECU 20 does not receive the directional motion signal from the motion detector 16 when the trailer 14 is not moving above the predetermined velocity in the reverse direction. However, other embodiments are, of course, contemplated in which the ECU 20 receives different respective electrical directional motion signals from the motion detector 16 when the trailer 14 is/is not moving above the predetermined velocity in the reverse direction. In any embodiment, the ECU 20 determines a backward movement of the motion detector 16 based on the directional motion signal received from the motion detector 16. The ECU 20 transmits an activation signal (e.g., a motion indicator signal) from an electrical output port 26 for activating the motion indicator 22 based on the received directional motion signal (e.g., based on the determined backward movement of the motion detector 16). For example, the ECU 20 transmits the activation signal (e.g., the motion indicator signal) from the electrical output port 26 for activating the motion indicator 22 when the ECU 20 determines the trailer 14 is moving above the predetermined velocity in the reverse direction.

The direction of movement of the motion detector 16 with respect to the trailer 14 is based on an orientation of the motion detector 16 on the trailer 14. In the illustrated embodiment, a face (e.g., side) of the motion detector 16 oriented toward a rear 30 of the trailer 14 is defined to be a rear side 32 of the motion detector 16.

The reverse direction is illustrated by any of the arrows $34_{1,2,3}$ (collectively 34). In one embodiment, the reverse direction 34 is considered to include any direction defined by a motion vector $36_{1,2,3}$ (collectively 36) having a motion vector component 40 extending away from the defined rear side 32 of the motion detector 16. For example, each motion vector 36 includes a first vector component $40_1$ and a second vector component $40_2$. Respective first and second axes $42_{1,2}$ (collectively 42) of the first and second vector components $40_1$, $40_2$ (collectively 40) are perpendicular to each other in a common plane that is substantially parallel to a road 44 on which the trailer 14 is traveling. Positive directions of the first and second axes $42_{1,2}$ are indicated by the arrow heads at the end of the respective axes 42. The first vector component $40_1$ is along the first axis $42_1$, and the second vector component $40_2$ is along the second axis $42_2$. Each of the vector components 40 is illustrated as having a length corresponding to the corresponding weight of the vector component 40 in the respective motion vector 36. The reverse direction 34 is considered to include any direction defined by a motion vector 36 having a motion vector component 40 extending away from the defined rear side 32 of the motion detector 16 and along the first axis $42_1$ (e.g., toward the rear of the trailer 14). For example, the motion vector 36 of the arrow 34 in the direction away from the defined rear side 32 of the motion detector 16 (e.g., extending along the first axis $42_1$) includes a first vector component $40_1$ having a length (e.g., weight) equal to the motion vector 36, while the length (e.g., weight) of the second vector component $40_2$ is zero (0). In another example, the motion vector 36 of the arrow 34 includes equal weights of the vector components $40_1$, $40_2$.

Although all of the reverse direction arrows 34 illustrated in FIG. 1 include second component motion vectors $36_2$ of either zero (0) weight or with weights in the positive direction along the second axis $42_2$, it is to be understood the reverse direction may include second component motion vectors $36_2$ in the negative direction along the second axis $42_2$.

From the above description, it is clear that the backward movement of the motion detector 16 and, consequently the trailer 14, occurs when the motion detector 16 (e.g., the trailer 14) travels above the predetermined velocity in either a straight backward movement in the reverse direction (see, for example, $34_k$, which does not include a second component motion vector $36_2$) or in an angled backward movement in the reverse direction (see, for example, $34_{2,3}$, which include positive first component motion vectors $36_1$ along the first axis $42_k$).

In the illustrated embodiment, an electrical power source 46 (e.g., battery) is included on the vehicle trailer 14. The motion detector 16, the ECU 20 and the directional motion indicator 22 are electrically powered by the battery 46. By including the motion detector 16, the ECU 20 and the battery 46 on the vehicle trailer 14, it is possible to electrically power the motion detector 16, the ECU 20 and the directional motion indicator 22, which is also on the vehicle trailer 14, and control the directional motion indicator 22 based on the motion detector 16 and the ECU 20 without transmitting/receiving communication signals and/or receiving electrical power from the vehicle tractor 12. Therefore, the motion detector 16, the ECU 20 and the directional motion indicator 22, along with the battery 46, may be considered a self-contained warning system 50 on the vehicle trailer 14. The self-contained warning system 50 on the vehicle trailer 14 permits the battery 46 to power the motion detector 16, the ECU 20 and the directional motion indicator 22 so that the motion detector 16 and the ECU 20 control the directional motion indicator 22 as discussed above, even if the vehicle trailer 14 is not connected (e.g., electrically connected) to the vehicle tractor 12.

Other embodiments, in which the electrical power source for the motion detector 16, the ECU 20 and the directional motion indicator 22 are not included on the vehicle trailer 14, are also contemplated. In these other embodiments, the electrical power source for powering the motion detector 16, the ECU 20 and the directional motion indicator 22 are included on a separate portion of the vehicle (e.g., on the tractor portion of the vehicle). Therefore, in these other embodiments, the vehicle trailer including the motion detector 16, the ECU 20 and the directional motion indicator 22 must be electrically connected to a power source that is external to the vehicle trailer. For example, the vehicle trailer including the motion detector 16, the ECU 20 and the directional motion indicator 22 may be electrically connected via a connector 52 to a power source on a vehicle tractor electrically connected to the trailer.

In the illustrated embodiment, the motion detector 16 and ECU 20 are included together as a single device 48. In another embodiment, it is also contemplated that the battery 46 is included as part of the device 46. Other embodiments, in which the motion detector 16, ECU 20 and the battery 46 are all separate components on the vehicle trailer 14 are also contemplated.

In one embodiment, it is contemplated that the motion detector 16 is an accelerometer.

Figure 2:
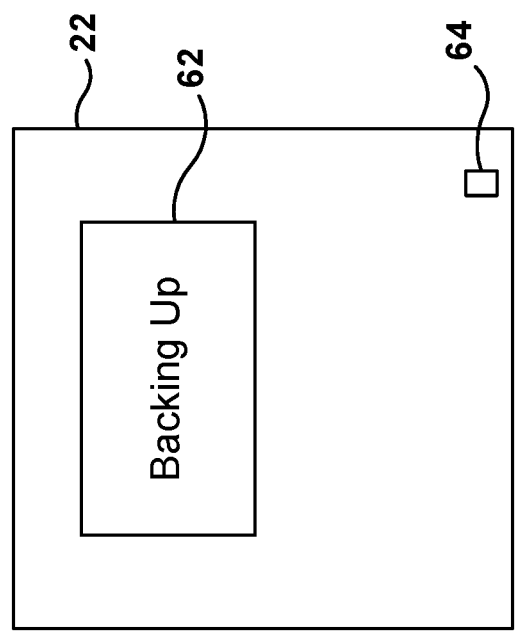
FIG. 2 illustrates a front view of a schematic representation of the directional motion indicator in accordance with one embodiment of an apparatus illustrating principles of the present invention.

With reference to FIG. 2, the directional motion indicator 22 includes at least one of a visual display 62 and an audio message generator 64. In one embodiment, at least one of the visual display 62 is illuminated and the audio message generator 64 is activated when the motion indicator 22 receives the activation signal (e.g., a motion indicator signal) from the electrical output port 26 of the ECU 20. For example, the visual display 62 is illuminated to display a message stating "BACKING UP" when the motion indicator 22 receives the activation signal (e.g., a motion indicator signal) from the electrical output port 26 of the ECU 20. In another example, the audio message generator 64 generates an audible message such as a beeping noise and/or a spoken message to indicate the trailer 14 is moving in the reverse direction.

Figure 3:
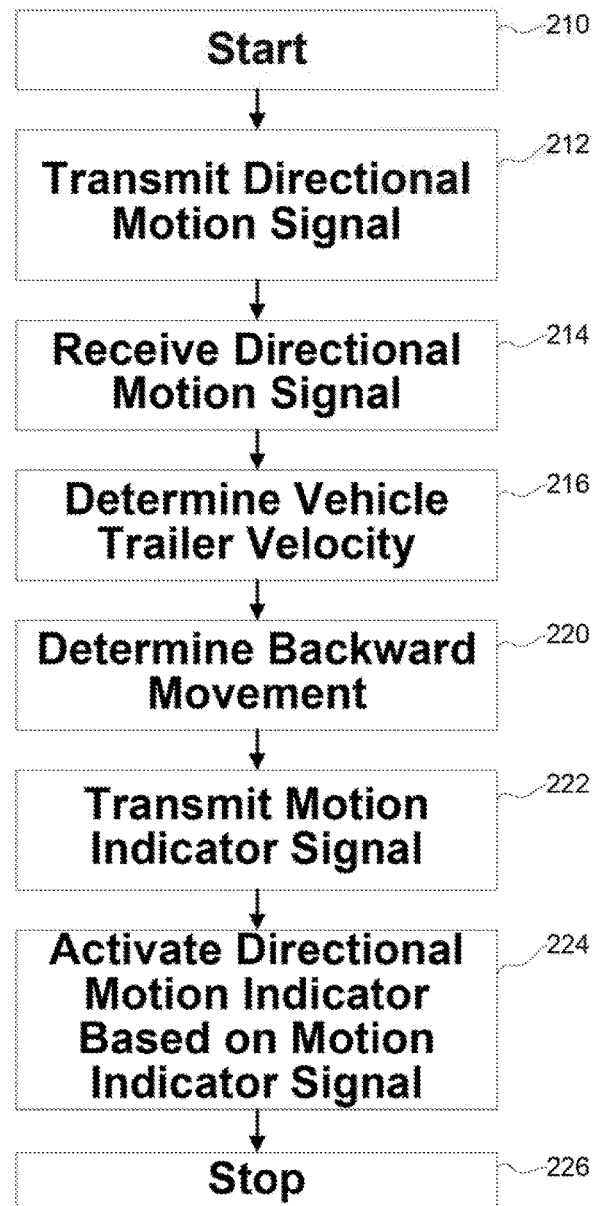
FIG. 3 is an exemplary methodology of activating the trailer vehicle motion indicator in accordance with one embodiment illustrating principles of the present invention.

With reference to FIG. 3, an exemplary methodology of the system shown in FIGS. 1 and 2 for activating a trailer directional motion indicator 22 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1-3, the process begins in a step 210. In a step 212, the motion detector 16 transmits the directional motion signal to the input port 24 of the ECU 20. As discussed above, the directional motion signal is based on the movement and the direction of the movement of the motion detector 16 and, consequently, the vehicle trailer 14. The directional motion signal is received at the input port 24 of the ECU 20 in a step 214. In a step 216, a velocity of the vehicle trailer 14 is determined. A backward movement of the vehicle trailer 14 is determined, as discussed above, by the ECU 20, in a step 220, based on the directional motion signal received in the step 214 and the velocity of the vehicle trailer 14.

In a step 222, the ECU 20 transmits a motion indicator signal based on whether backward movement of the vehicle trailer 14 exists, as determined in the step 220. The motion indicator signal is transmitted from the output port 26 of the ECU 20 to the directional motion indicator 22. The directional motion indicator 22 is activated in a step 224 based on the motion indicator signal. For example, as discussed above, the directional motion indicator 22 is activated in the step 224 if the motion indicator signal indicates the vehicle trailer 14 is traveling in a reverse (e.g., backward) direction above the predetermined velocity.

The process stops in a step 226.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A device for controlling a directional motion indicator, the device comprising:
    a motion detector transmitting a directional motion signal based on a movement and a direction of the movement of the motion detector;
    a controller including a controller input port receiving the directional motion signal, the controller determining a backward movement of the motion detector based on the directional motion signal indicating a motion vector having a motion vector component extending away from a rear side of the motion detector and transmitting a motion indicator signal, via a controller output port, based on the determined backward movement of the motion detector; and
    an electrical power source electrically connected to both the motion detector and the controller, the motion detector and the controller being electrically powered by the power source, the motion detector, the controller and the electrical power source are a self-contained system on an associated vehicle trailer.

2. The device for controlling a directional motion indicator as set forth in claim 1, wherein:
    the direction of the movement is based on an orientation of the motion detector.

3. The device for controlling a directional motion indicator as set forth in claim 1, wherein:
    the motion indicator signal is transmitted to the directional motion indicator.

4. The device for controlling a directional motion indicator as set forth in claim 1, wherein:
    the movement is identified when the motion detector is moving at least a predetermined velocity.

5. The device for controlling a directional motion indicator as set forth in claim 4, wherein:
    the predetermined velocity is 1.0 mph.

6. The device for controlling a directional motion indicator as set forth in claim 1, wherein:
    the backward movement includes at least one of a straight and an angled movement of the motion detector.

7. The device for controlling a directional motion indicator as set forth in claim 1, wherein:
    the motion detector is an accelerometer.

8. A vehicle trailer backup warning system, comprising:
    a motion detector transmitting a directional motion signal based on a movement and a direction of the movement of the motion detector;
    a controller including a controller input port receiving the directional motion signal, the controller determining a backward movement of the motion detector based on the directional motion signal indicating a motion vector having a motion vector component extending away from a rear side of the motion detector and transmitting a motion indicator signal, via a controller output port, based on the determined backward movement of the motion detector;
    a directional motion indicator activated based on the transmitted motion indicator signal; and
    an electrical power source electrically connected to the motion detector, the controller and the directional motion indicator, the motion detector, the controller and the directional motion indicator being electrically powered by the power source, the motion detector, the controller and the electrical power source being a self-contained system on an associated vehicle trailer.

9. The vehicle trailer backup warning system as set forth in claim 8, wherein:
    when activated, the directional motion indicator illuminates a visual display.

10. The vehicle trailer backup warning system as set forth in claim 9, wherein:
    when activated, the directional motion indicator also generates an audible message.

11. The vehicle trailer backup warning system as set forth in claim 8, wherein:
    the direction of the movement is based on an orientation of the motion detector.

12. The vehicle trailer backup warning system as set forth in claim 11, wherein:
    the motion detector is included on an associated vehicle trailer and oriented with an identified rear side of the motion detector facing a rear of the associated vehicle trailer; and
    the backward movement occurs when the associated vehicle trailer is traveling along a vector having the motion vector component extending away from the identified rear side of the motion detector.

13. The vehicle trailer backup warning system as set forth in claim 12, wherein:
    the backward movement occurs when the associated vehicle trailer is traveling along at least one of a straight and a curved direction.

14. The vehicle trailer backup warning system as set forth in claim 8, wherein:
    the movement is identified when the motion detector is moving at least a predetermined velocity.

15. A method for activating a vehicle trailer directional motion indicator, the method comprising:
    transmitting a directional motion signal based on a movement and a direction of the movement of a motion detector on an associated vehicle trailer;
    receiving the directional motion signal;
    determining a backward movement of the vehicle trailer based on the directional motion signal indicating a motion vector having a motion vector component extending away from an identified rear side of the motion detector;
    transmitting a motion indicator signal based on the determined backward movement of the vehicle trailer;
    receiving electrical power at the motion detector and the directional motion indicator from a power source on the associated vehicle trailer, the motion detector and the electrical power source being a self-contained system on an associated vehicle trailer; and
    activating the directional motion indicator based on the motion indicator signal.

16. The method for activating a vehicle trailer directional motion indicator as set forth in claim 15, wherein the activating step includes:

activating the directional motion indicator if the backward movement of the vehicle trailer is determined.

17. The method for activating a vehicle trailer directional motion indicator as set forth in claim 16, wherein the activating step includes:

illuminating a visual display.

18. The method for activating a vehicle trailer directional motion indicator as set forth in claim 16, wherein the activating step includes:

playing an audible message.

19. The method for activating a vehicle trailer directional motion indicator as set forth in claim 15, further including:

determining the movement of the associated vehicle trailer based on a velocity of the associated vehicle trailer.

20. The method for activating a vehicle trailer directional motion indicator as set forth in claim 15, further including:

if the velocity of the associated vehicle trailer is at least a predetermined velocity in a backward direction, determining the backward movement exists for the associated vehicle trailer.

21. The method for activating a vehicle trailer directional motion indicator as set forth in claim 20, further including:

if the backward movement exists for the associated vehicle trailer, transmitting the motion indicator signal to activate the directional motion indicator.

* * * * *